MOLD PANEL FOR CASTING CONCRETE

BACKGROUND OF THE INVENTION

The present invention relates to apparatus for moulding building materials and, particularly, for moulding concrete where the curing of the concrete is accelerated by the application of heat.

Heretofore, heated molds or form panels for containing and curing poured concrete have been provided by large hollow panels. The panels must provide a large surface area against which the concrete is poured so that the number of such panels required to define the mold for the concrete is not excessive. The larger size of these panels alone dictate that they must be bulky and heavy. Furthermore, in the past, where the panels are heated so that heat is delivered to the wet concrete accelerating the curing process, the panels have been hollow to provide space inside the panel for tubing and other conduits that carry steam pipes. For example, one panel of this type provides a shell and a web or cover on top of the shell, the outside of web being the surface against which the concrete is poured and the shell defining the passages that contain the steam pipes. These panels require external reenforcement to maintain the shell rigid and so the complete structure including the reinforcing is sometimes found to be excessively bulky and heavy which, of course, adds to the difficulties of erecting the panels to provide a form for the concrete and then later tearing down the panels to use them again after the concrete has cured. To these difficulties are added the necessary time and effort to connect steam sources to the individual panels and, then disconnect when the panels are taken down.

It is the principal object of the present invention to provide a modular type heated mold panel for concrete which provides a relatively large heated surface against which the concrete is poured, the panel having sufficient strength and rigidity to withstand the rigors of in situ use, but lighter in weight and less bulky then heated panels of the same size used in the past.

SUMMARY OF THE INVENTION

It is a principal feature of the present invention to provide a heated mold panel for casting concrete including a panel base that may be a solid sheet of relatively rigid material providing the necessary rigidity and strength that such a panel requires and substantially defining the panel in size and shape. A plurality of connecting grooves are provided in one surface of the base, called the base surface, and heating elements are located in the grooves, the grooves being sufficiently deep that the heating elements do not extend across the plane of the base surface and yet, the grooves do not substantially decrease the strength or rigidity of the base. At least one layer of non-corrosive, non-porous material covers the base surface and the heating elements in the grooves, spanning the grooves, provides a smooth outside surface generally parallel to the base surface, the layer of material being generally contiguous with the base surface so that except where the grooves are located, the covering material is entirely supported by the base surface; and means are provided for connecting the elements to a source of energy.

In a preferred embodiments, a single continuous electric heating element is provided in the grooves and so the grooves interconnect and the space around the elements defined by the grooves and the layer of covering material provides sufficient clearance around the electric element so that air flows freely through that space around the element. Heat flow from the element to the concrete against the outside surface of the panel is by radiation and by convection of the air flow around the element.

Other objects of the invention are the following:

To provide an improved heated panel for containing a material;

To provide an improved heated panel for molding and accelerating the curing of concrete;

To provide such a panel that is relatively thin and relatively light in weight, but having sufficient rigidity and strength for in situ use;

To provide such a panel in which heat is provided electrically and is controlled automatically to maintain the surface of the panel against the concrete at an even heating temperature while the concrete cures; and To provide such a panel with means for indicating when said panel has reached said temperature or is being heated;

These and other objects, features and advantages of the present invention will be apparent from the following description of embodiments of the invention as described herein below with reference to the accompanying drawings.

DESCRIPTION OF THE DRAWINGS

FIG. 5 through 7 show other groove configurations of suitable shape and relative size; and FIG. 8 is a plan view of another embodiment grooved uniformally throughout the whole panel to accommodate a variety of patterns of the electrical heating element and provide uniform flow paths for air heated in the grooves.

DESCRIPTION OF EMBODIMENTS OF THE INVENTION

Figure 1A:
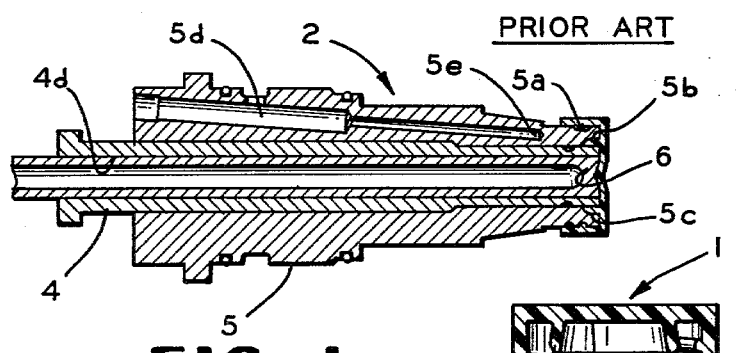
FIG. 1 is a view from the concrete side of a group of panels abutting, with covering removed from a panel, showing the grooves, the electric heating element laid in the grooves and the location of electrical parts.

Several abutting panels A, B, C, D, E and F are shown in FIGURE I as viewed from the concrete side, also called the mold side. Panel E is shown with the mold side cover layer removed to reveal the arrangement of grooves containing the heating element. The surface of each of the panels shown in FIGURE I may be rectangular or square and measure several feet in each direction. Typical panel dimensions are four feet by eight feet.

The panels, such as panel E, are quite rigid and have sufficient strength to remain rigid abutting each other under the pressure of poured concrete, and also withstand the rigors and abuse of in situ use without requiring external reinforcing structures. For example, the panel base may be heavy plywood, at least an inch thick for the four foot by eight foot size. In this embodiment, the base I is grooved by interconnecting grooves that U.S. Patent  Dec. 9, 1980  4,238,106

FIG. 1 — PRIOR ART

CORE PIN COOLING FOR HIGH SPEED INJECTION MOLDING APPARATUS

BACKGROUND OF THE INVENTION

In recent years, the soft drink industry has adopted an internally threaded thermoplastic closure for application to the threaded necks of soft drink beverage bottles. Typical closures of this type are shown in U.S. Pat. Nos. 3,987,921 and 4,016,996.

This event has created a massive market for such closures which can only be economically produced in large quantities by injection molding in multi-cavity injection molds. However, due to the relatively complicated interior construction of such closures, involving both internally projecting threads in the side wall and a sloped annular sealing rib on the inner side of the panel of the closure, it is necessary that the closure be stripped from the core pin of the forming mold and this, in turn, requires that the molded article be cooled to essentially a self-sustaining temperature before the stripping action can occur. Therefore, there is a distinct need to apply improved cooling to the mold producing such articles in order to effect a significant reduction in the cycle time, hence in the number of articles produced per hour by a given injection molding machine.

SUMMARY OF THE INVENTION

The invention provides a new cooling path configuration for cooling fluid for the core pin or force plug of an injection mold, so that an extremely rapid cooling of the injection molded article is obtained to yield a maximum production rate. In accordance with the invention, the conventional cooling sleeve of a core pin which has generally longitudinally extending fluid passage holes bored into its walls, is replaced by an outer sleeve and a co-operating inner sleeve element having a plurality of helically extending channel formed on its external periphery, with one channel being employed to conduct incoming cooling fluid from an axially remote end of the sleeve to the molding region and the next adjacent channel utilized to conduct heated fluid from the molding region to a discharge passage at the axially remote end of the inner sleeve. In a preferred embodiment of this invention, the helical channels comprise six parallel helices, with three of the helical channels being employed for conducting cooling fluid from the axially remote end of the core pin towards the molding end of the core pin, and the remaining three channels being utilized to conduct the heated fluid axially rearwardly along the core pin to a heated fluid discharge opening located at the axially remote end of the core pin.

The mere substitution of the improved cooling configuration constructed in accordance with this invention has achieved a reduction in cooling rate of a thermoplastic molded closure of the type referred to by a factor of two seconds per cycle, which amounts to an increase in productivity of the injection molding apparatus on the order of at least thirty percent.

Other objects and advantages of the invention will be readily apparent to those skilled in the art from the following detailed description, taken in conjunction with the annexed sheets of drawings on which is shown a preferred embodiment of this invention.

BRIEF DESCRIPTION OF DRAWINGS

Figure 1A:
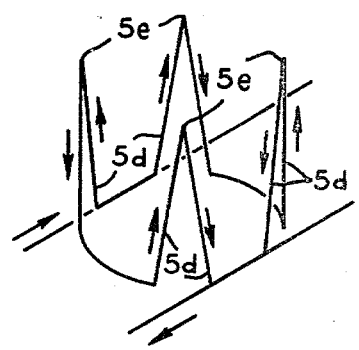

FIG. 1 is a sectional view of an assembled core pin incorporating a conventional cooling channel configuration.

FIG. 1a is a schematic view of the cooling fluid flow path employed in the apparatus of FIG. 1.

Figure 2:
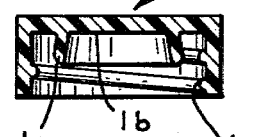
FIG. 2 is an enlarged cross-section view of abutting panels taken as shown in FIGURE I showing the location of the electrical parts, the grooves and the covering layer providing a smooth concrete side surface.

FIG. 2 is an enlarged scale sectional view of the closure to be formed by injection molding.

Figure 3:
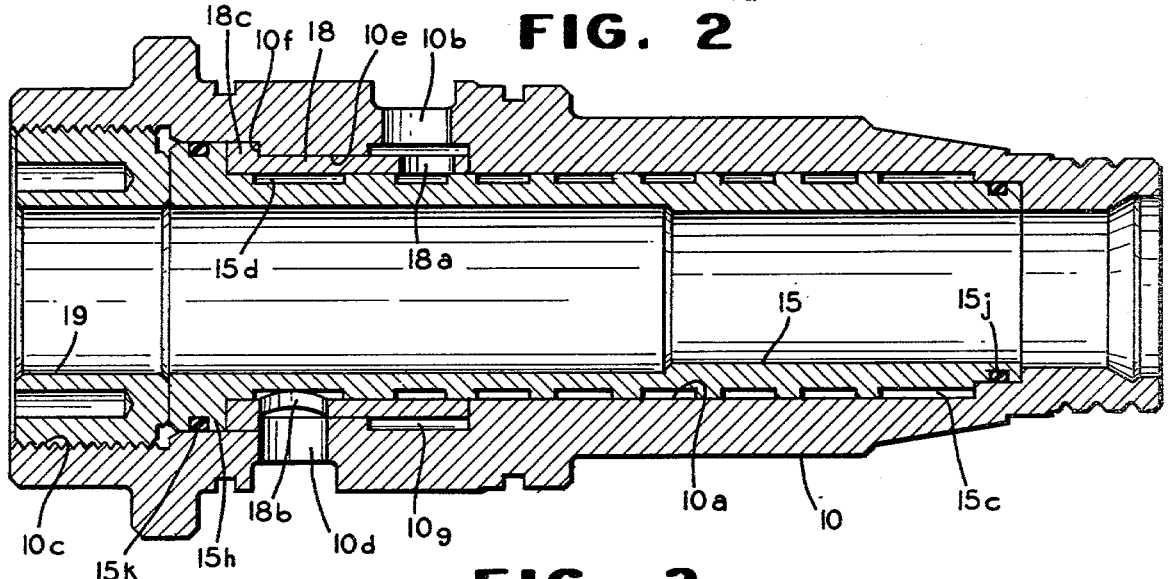
FIG. 3 is an another view of the electrical parts and connections of a panel taken as shown in FIG. 2.

FIG. 3 is an enlarged scale view similar to FIG. 1 of a core pin incorporating fluid cooling apparatus embodying this invention.

Figure 4:
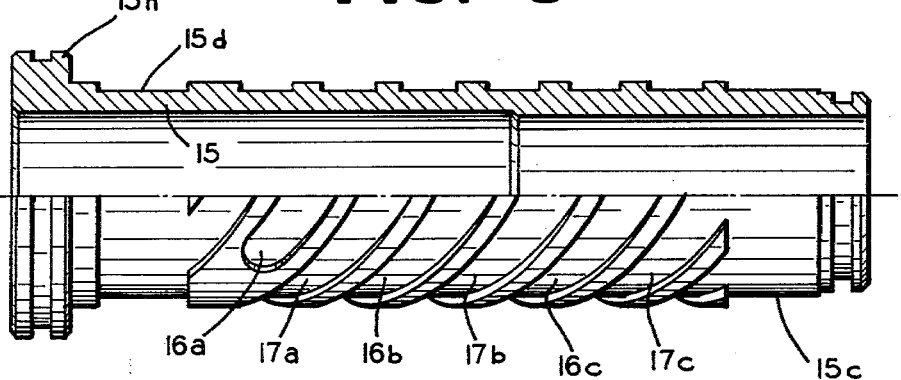
FIG. 4 illustrates a junction box feeding power to several panels.

FIG. 4 is an elevational view, partly in section, of the cooling sleeve element employed to effect the cooling of the core pin unit shown in FIG. 3.

Figure 5:
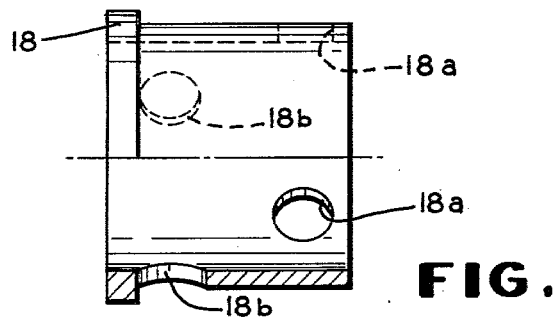

FIG. 5 is a side elevational view, partly in section, of the fluid distributing sleeve employed in conjunction with the cooling apparatus embodying this invention.

DESCRIPTION OF PREFERRED EMBODIMENT

Referring to FIG. 1, the elements 4 and 5 indicate the outer sleeve elements of a commercially available core pin assembly 2 having molding surface $5a$, $5b$ and $5c$ respectively formed on its inner and outer end surfaces which are contacted by hot plastic injected into an injection molding cavity defined in part by core pin assembly 2, of which the sleeve elements 4 and 5 form a major component. The molding surface $5a$ defines the internal thread contours $1a$ of a threaded plastic closure 1 (FIG. 2) of the type shown in the above-mentioned patents, while the contour $5b$ defines the outer periphery of the panel portion $1b$ and the contour $5c$ defines one side of the annular sealing flange $1c$ provided in such closure. Obviously, to complete the injection molding cavity, the molding surfaces $5a$, $5b$ and $5c$ have to be exteriorly surrounded by a female mold (not shown) which defines the remainder of the body portion of the closure 1. A fluid cooled knock-out pin 6 is slidably inserted within the hollow bore $4d$ of the inner sleeve element 4 in order to define the center of panel portion $1b$ of the closure 1 to be molded and the other side of the annular sealing flange $1c$.

The objective of the instant invention is to achieve as rapidly as possible, the cooling of the end portion of the core element 5 which defines molding surfaces $5a$, $5b$ and $5c$. The sleeve 5 not only defines the molding surfaces $5a$, $5b$ and $5c$ at one axial end thereof, but includes generally axially extending cooling passages $5d$ which were disposed around the periphery of the sleeve and generally angularly inclined so as to intersect near the molding end of the sleeve 5 as indicated at $5e$. As best shown in FIG. 1a, the cooling fluid was circulated from the axially remote end of an axial passage $5d$ down toward the mold area intersection $5e$ and then back to the remote end through the next axial passage $5d$. This arrangement obviously did not put any significant volume of cooling water into and through the molding areas of the sleeve 5 that were immediately adjacent the molding surfaces $5a$, $5b$ and $5c$ and hence the cooling efficiency of the arrangement left much to be desired. All these elements are, however, conventional and they do not form any part of the instant invention.

Referring now to FIG. 3, it will be apparent that in accordance with this invention, the core pin element 10, which has the same external configuration as core pin element 5 of FIG. 1, has been divided into two elements by the insertion in the central bore $10a$ of such core pin of a cooling channel sleeve 15. Sleeve 15, which is best shown in FIG. 4, has a plurality of separate, but parallel, helically extending grooves formed on its periphery. In the preferred form of the invention, six such sets of grooves are provided, with the grooves 16a, 16b and 16c being respectively utilized to conduct cooling fluid from the axially remote end of the cooling sleeve, represented by the left hand end of FIG. 4, to the molding region represented by the right hand end of FIG. 4, and three helical grooves 17a, 17b and 17c, respectively intermediate grooves 16a, 16b and 16c are utilized for respectively conducting the heated cooling fluid from the molding region of the sleeve 15 back to the axially remote end of the sleeve, represented by the left hand end in FIG. 4.

Cooling fluid is directed through an inlet 10b and an annular channel 10g into the three helical cooling channels 16a, 16b and 16c by three holes 18a respectively provided in a fluid guide sleeve 18 which snugly surrounds the left hand end of the cooling sleeve 15. The cooling fluid flowing to the right, or toward the molding region down each of the helical channels 16a, 16b and 16c is intermingled in an annular channel 15c provided at the end of the sleeve 15 and hence freely enters the discharge charge helical passages 17a, 17b and 17c to move away from the molding area to enter an annular channel 15d provided in the left hand end of sleeve 15, and thence through a plurality of holes 18b into an appropriate radial fluid exit passage 10d for heated fluid.

As best illustrated in FIG. 3, cooling sleeve 15 is secured in the bore 10a of core pin element 10 by a threaded annular plug 19 which engages internal threads 10c provided on core pin element 10. The fluid guide sleeve 18 fits into an annular recess 10e provided in the core pin element 10 and an enlarged shoulder 18c on sleeve 18 rests on an internal shoulder 10f. The enlarged shoulder 18c is in turn engaged by an enlarged shoulder 15h provided on the cooling sleeve 15. An O ring seal 15k provided on the enlarged shoulder portion 15h prevents any undesirable fluid leakage between the sleeve 15 and the adjacent portions of the bore 10a of annular core pin element 10. Similarly, at the other end of cooling sleeve 15, an O ring seal 15j prevents any leakage of the coolant fluid at that end of the apparatus.

As mentioned, coolant fluid is introduced to the three inlet holes 18a through a radial passage 10b provided in the core pin element 10 and an enlarged annular channel 10g passes such fluid around the periphery of the fluid directing sleeve 18 to cause it to enter the entry ports 18a. A coolant discharge passage 10d is provided in element 10 in communication with the annular channel 15d provided in the coolant sleeve 15 to permit the heated fluid to pass out of the core pin assembly. The cross sectional areas of all of the helical passages is large enough to produce a turbulent flow of fluid therethrough.

As previously mentioned, the substitution of the aforedescribed cooling channels results in a significant decrease in mold cycle time for the molding of internally threaded plastic screw caps. Cycle time has been reduced by up to two seconds and, in most instances, this amount to an increase in productive output of a multi-cavity injection mold machine on the order of thirty to forty percent. Furthermore, the described configuration passes a much greater volume of turbulent flow cooling fluid over a much larger area of the core pin element 10 without reducing the structural strength of the assemblage, which is subjected to mold closing forces up to 250 tons.

Some modifications of this invention will be readily apparent to those skilled in the art, and it is intended that the true scope of the invention be determined solely by the appended claims.

I claim:

1. A core pin for an injection mold comprising an outer sleeve defining external molding surfaces on one axial end thereof, an inner sleeve insertable within said outer sleeve and terminating adjacent said one axial end of said outer sleeve, fluid sealing means between both axial end portions of said inner and outer sleeves, at least one pair of helically extending parallel grooves formed in one of the adjacent surfaces of said sleeves intermediate said sealing means, means connecting said grooves of each pair respectively to a cooling fluid inlet port and a fluid discharge port, and means defining an annular channel between the adjacent surfaces of the ends of said sleeves adjacent the molding surfaces for inter-conecting the ends of all said grooves.

2. A core pin for an injection mold comprising an outer sleeve defining molding surfaces on one axial end thereof, a cooling sleeve insertable within said outer sleeve and terminating adjacent said one axial end of said outer sleeve, fluid sealing means between both axial end portions of said cooling sleeve and said outer sleeve, at least one pair of helically extending parallel grooves formed in said cooling sleeve surface intermediate said sealing means, means connecting said grooves of each pair respectively to a cooling fluid inlet port and a fluid discharge port, and channel means on the end of said cooling sleeve adjacent the molding surfaces for inter-connecting the ends of all said grooves.

3. The core pin of claim 2 wherein said cooling sleeve has three pairs of said helically extending parallel grooves.

4. The core pin of claim 2 wherein said means connecting said grooves of each pair respectively to a cooling fluid inlet port and a discharge port comprises a fluid guide sleeve snugly surrounding said cooling sleeve and having axially spaced ports therein.

5. The core pin of claim 3 wherein said means connecting said grooves of each pair respectively to a cooling fluid inlet port and discharge port comprises a fluid guide sleeve snugly surrounding said cooling sleeve and having two axially spaced sets of three circumferentially spaced ports therein.

6. The core pin of claim 1, 2 or 3 wherein each of said grooves is of sufficient width and depth to produce turbulent flow of fluid therethrough.

* * * * *